(12) United States Patent
Aggarwal et al.

(10) Patent No.: US 7,433,969 B2
(45) Date of Patent: Oct. 7, 2008

(54) METHOD AND APPARATUS FOR REPRESENTING LABEL SWITCHED PATHS

(75) Inventors: Rahul Aggarwal, Menlo Park, CA (US); Ravi Chandra, Los Gatos, CA (US)

(73) Assignee: Redback Networks Inc., San Jose, CA (US)

( * ) Notice: Subject to any disclaimer, the term of this patent is extended or adjusted under 35 U.S.C. 154(b) by 916 days.

(21) Appl. No.: 10/036,674

(22) Filed: Dec. 31, 2001

(65) Prior Publication Data

US 2003/0126289 A1 Jul. 3, 2003

(51) Int. Cl.
*G06F 15/173* (2006.01)

(52) U.S. Cl. .................. 709/242; 709/238; 370/351; 370/389; 370/392; 370/469

(58) Field of Classification Search .............. 709/245, 709/238, 242; 370/225, 401, 351, 389, 392, 370/469
See application file for complete search history.

(56) References Cited

U.S. PATENT DOCUMENTS

| | | | |
|---|---|---|---|
| 5,265,092 A * | 11/1993 | Soloway et al. | 370/238 |
| 5,524,254 A * | 6/1996 | Morgan et al. | 709/245 |
| 6,205,488 B1 | 3/2001 | Casey et al. | |
| 6,477,166 B1 | 11/2002 | Sanzi et al. | |
| 6,501,754 B1 | 12/2002 | Ohba et al. | |
| 6,954,463 B1 * | 10/2005 | Ma et al. | 370/401 |
| 7,139,278 B2 * | 11/2006 | Gibson et al. | 370/401 |
| 2001/0015978 A1 * | 8/2001 | Blanset et al. | 370/395 |
| 2001/0033574 A1 | 10/2001 | Enoki et al. | |
| 2002/0176370 A1 | 11/2002 | Ohba et al. | |
| 2003/0198182 A1 * | 10/2003 | Pegrum et al. | 370/225 |
| 2004/0202171 A1 * | 10/2004 | Hama | 370/395.1 |

FOREIGN PATENT DOCUMENTS

WO PCT/US02/041549 4/2003

OTHER PUBLICATIONS

PCT/US2002/041549, Mar. 18, 2004, Written Opinion.
Awduche, D., et al., "Requirements for Traffic Engineering Over MPLS," Network Working Group Request for Comments: 2702, Sep. 1999.
Davie, B., et al., "MPLS Using LDP and ATM VC Switching," Network Working Group Request for Comments: 3035, Jan. 2001.
Rosen, E., et al., "Multiprotocol Label Switching Architecture," Network Working Group Request for Comments: 3031, Jan. 2001.
Y. Rekhter, and T. Li, "A Border Gateway Protocol 4 (BGP-4)", Network Working Group Request for Comments: 1654, Jul. 1994, pp. 1-57.

* cited by examiner

*Primary Examiner*—Ario Etienne
*Assistant Examiner*—Uzma Alam
(74) *Attorney, Agent, or Firm*—Blakely, Sokoloff, Taylor & Zafman LLP

(57) ABSTRACT

A method and apparatus for representing a label switched path. In one embodiment, a computer implemented method comprises representing a label switched path (LSP) with a data structure, the data structure indicating a virtual ingress and an identifier to distinguish the LSP from other LSPs represented with the same virtual ingress.

22 Claims, 10 Drawing Sheets

FORWARDING STRUCTURE
201

| SLOT 203 |
| PORT 205 |
| FLOW IDENTIFIER 207 |
| FORWARDING FEATURE 209 |

METHOD AND APPARATUS FOR REPRESENTING LABEL SWITCHED PATHS

BACKGROUND OF THE INVENTION

1. Field of the Invention

The invention relates to the field of communication. More specifically, the invention relates to communication networks.

2. Background of the Invention

The multi-protocol label switching (MPLS) protocol may be categorized as a network layer protocol of the Open Standards Institute (OSI) reference model. MPLS provides a method for generically tunneling data through networks with label switched paths (LSPs).

Routers typically internally represent each connection (whether it be an IP route, a label switched path, etc.) as an interface or set of interfaces, which is a network layer entity. Since an interface is a network layer entity, it includes various pieces of information needed for the network layer.

FIG. 1 (Prior Art) is a diagram illustrating an exemplary data structure for an interface. An interface structure 101 includes multiple fields describing the interface. An interface ID field 103 indicates a value identifying the interface. An interface type field 105 describes the type of interface (e.g., Ethernet, ATM, PoS, etc.). An IP address field 107 identifies a 32-bit IP address corresponding to the interface. A secondary IP address field 109 indicates a second 32-bit IP address for the interface. A maximum transmission unit (MTU) field 111 indicates the maximum allowable packet size to be transmitted with the interface. A bandwidth field 113 indicates the amount of bandwidth allocated to the interface. The interface structure 101 is a relatively expensive structure.

The relatively expensive interface structure consumes memory of a network element and consumes bus resources when the network element transfers interface structures to its line cards. A network element cannot maintain a relatively large number of label switched paths without hampering its performance because of the relatively expensive cost of the interface structure.

BRIEF SUMMARY OF THE INVENTION

A method and apparatus for representing label switched paths is described. According to one aspect of the invention, a computer implemented method provides for representing a label switched path (LSP) with a data structure. The data structure indicates a virtual ingress and an identifier to distinguish the LSP from other LSPs represented with the same virtual ingress.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention.

A method and apparatus for representing label switched paths is described. According to one embodiment of the invention, a forwarding data structure is used. These forwarding data structures are used for processing LSP packets and non-LSP packets. These forwarding data structures are less expensive than interface structures because they do not contain network layer information. The forwarding data structures contain information to describe links from a network element to its neighboring network elements.

Figure 1:
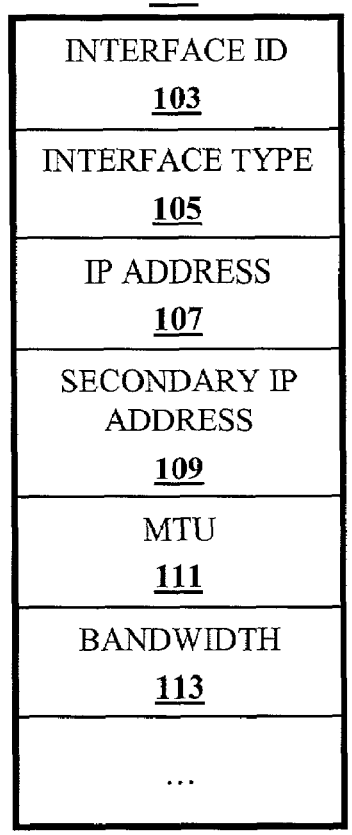
FIG. 1 (Prior Art) is a diagram illustrating an exemplary data structure for an interface.
Figure 2:
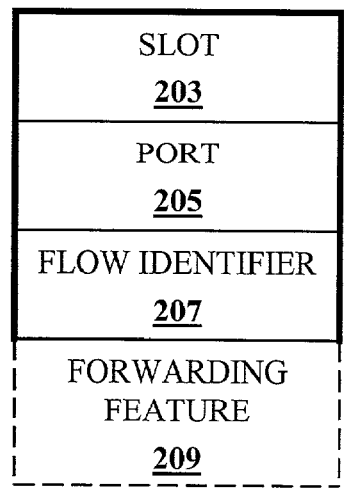
FIG. 2 is an exemplary diagram of a forwarding data structure according to one embodiment of the invention.

FIG. 2 is an exemplary diagram of a forwarding data structure according to one embodiment of the invention. In FIG. 2, forwarding structure 201 includes the following fields: a slot field 203, a port field 205, and a flow identifier field 207. The forwarding data structure may also include a forwarding feature field 209. The slot field 203 indicates a slot of a network element. The port field 205 indicates a port of the slot indicated in the slot field 203. However, a port may not always be identified (e.g., because a card in a slot only has a single egress port). The flow identifier field 207 indicates an identifier for distinguishing different flows of traffic received on the slot and port indicated in the forwarding data structure 201. The forwarding features field 209 indicates forwarding features (e.g., packet counters, quality of service, packet classification) to be applied to packets. In alternative embodiments, forwarding features are located in a separate data structure and indexed by a slot, port, and flow identifier. A number of fields in a number of structures and tables will be described herein. It should be understood that each such field can be implemented in different embodiments to "indicate" information using different techniques (e.g., store the information directly in the field, store a reference to the information, etc.).

In a network element with the forwarding structure, non-LSP packets are processed with a forwarding structure for ingress into the network element and a forwarding structure for egress from the network element. Forwarding features may be applied to non-LSP packets with the forwarding structure 201 and switched through a network element with the forwarding structure. Similarly, forwarding features may be applied to LSP packets associated with a forwarding structure that described an LSP. Various embodiments may indicate LSPs with forwarding structures differently. For example, all forwarding structures that describe LSPs may indicate the same virtual slot and virtual port, but different flow identifiers to distinguish LSPs. Alternatively, forwarding structures that describe LSPs may indicate the same virtual slot for all LSPs, but distinguish LSPs with different virtual ports.

The described forwarding structure is less expensive that an interface structure and may be used to represent LSPs. Representing LSPs with such a relatively inexpensive data structure provides substantial memory savings and enables the support of relatively large numbers of LSPs without reducing performance of a network element. In addition, representing LSPs with such relatively inexpensive structures reduces the amount of resources consumed when downloading LSP information to the control cards of a network element.

The control plane of a network element may be implemented differently to represent LSPs with forwarding structures. In one embodiment, functionality for representing LSPs with forwarding structures is added to the module that manages interface structures. In another embodiment, a separate module is implemented with the functionality to support forwarding structures for LSPs and non-LSP packets. In an alternative embodiment, a module is implemented with the functionality to manage forwarding structures for non-LSP packets and a separate module is implemented to manage forwarding structures for LSPs. Another embodiment will be illustrated in FIG. 3.

Figure 3:
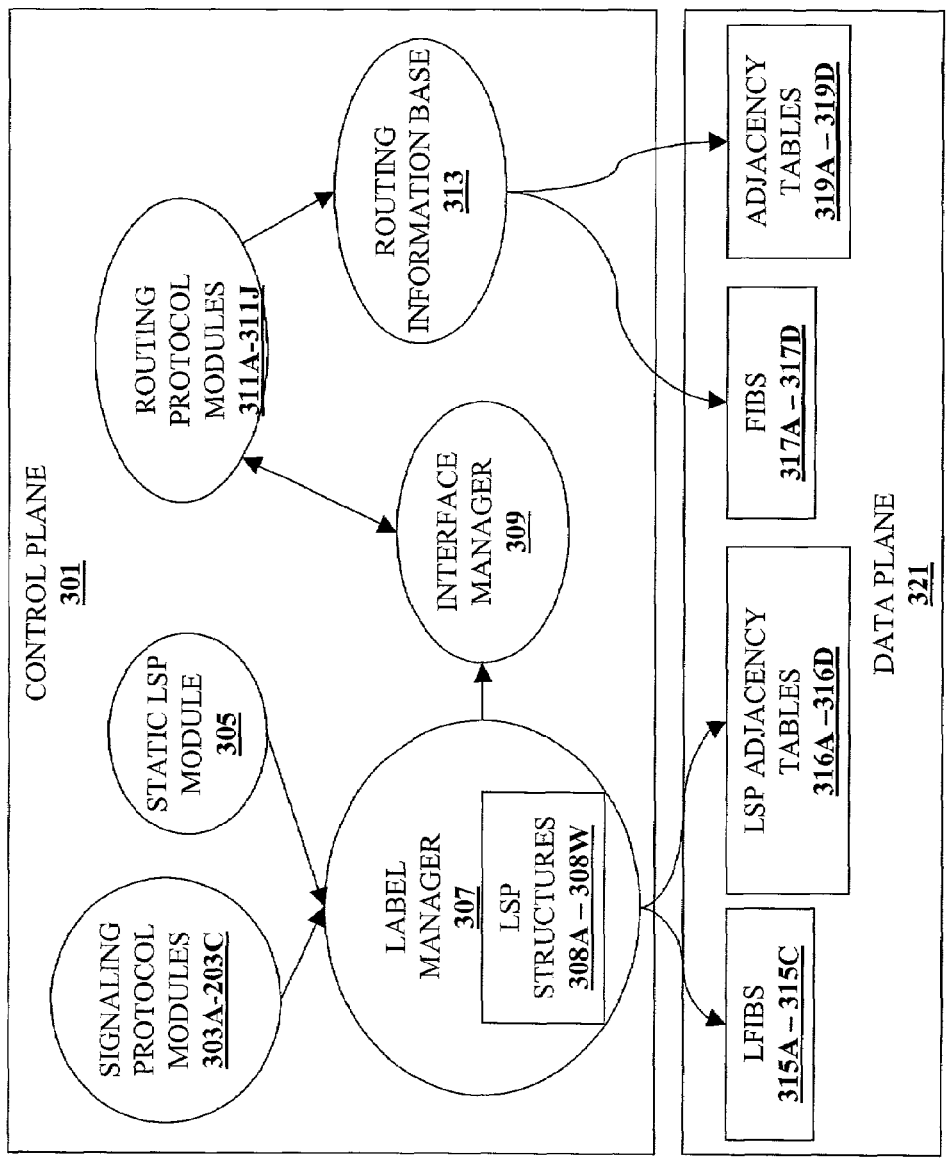
FIG. 3 is an exemplary diagram illustrating interaction between a control plane and a data plane according to one embodiment of the invention.

FIG. 3 is a diagram illustrating an exemplary control plane according to one embodiment of the invention. In FIG. 3, a control plane 301 includes the following: signaling protocol modules 303A-303C, a static LSP module 305, a label manager 307, an interface manager 309, routing protocol modules 211A-211J, and a routing information base 313. The signaling protocol modules 303A-303C (e.g., label distribution protocol, RSVP, BGP label piggybacking, etc.) establish label switched paths (LSPs) and establish labels with the label manager 307. In addition to the signaling protocol modules 303A-303C, the static LSP module 305 establishes LSPs configured by a user. The user may configure the LSPs via a user interface, a script, etc. The static LSP module 305 also establishes labels with the label manager 307 for configured LSPs3. The label manager 307 manages LSP structures 308A-308W.

Figure 4:
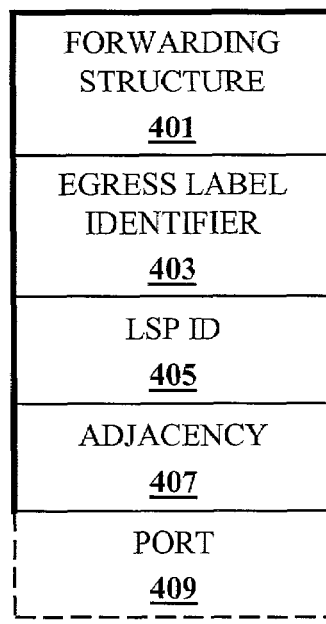
FIG. 4 is an exemplary diagram of the LSP structure 208A according to one embodiment of the invention.

FIG. 4 is an exemplary diagram of the LSP structure 308A according to one embodiment of the invention. In FIG. 4, the LSP structure 308A includes multiple fields describing an LSP. A forwarding structure field 401 indicates a forwarding structure for an LSP. The LSP structure 308A also includes an egress label field 403. The egress label field 403 indicates an egress label identifier to be applied to a packet transmitted out of a network element. An LSP ID field 405 indicates a value identifying the LSP. Various embodiments may allocate the LSP ID differently. In one embodiment, signaling protocol modules 303A-303C and the static LSP module 305, generate the LSP ID. In another embodiment, the label manager 307 generates the LSP ID. The LSP structure 308A also includes an adjacency field 407. The adjacency field 407 indicates adjacency information. In one embodiment, the adjacency information includes an adjacency ID, a forwarding structure for an egress from a network element, and encapsulation information, which will be described later in more detail. In another embodiment, the adjacency information includes an encapsulation ID to reference the encapsulation information.

In an alternative embodiment, adjacency information includes a slot, an adjacency ID, and encapsulation information.

In FIG. 4, the LSP structure 308A also includes a port field 409. The port field 409 is used to identify a port to transmit packets along the LSP identified by the LSP structure 308A. However, a port may not be identified because a card in a slot only has a single egress port. In certain embodiments, the port field 409 may not be included in the LSP structure 408A because the adjacency field 407 indicates adjacency information that includes the port.

Returning to FIG. 3, the label manager 307 published forwarding structures to the interface manager 309. In one embodiment, the label manager 307 manages all forwarding structures for a network element. In another embodiment, the label manager manages forwarding structure allocated for LSPs while the interface manager manages forwarding structure for non-LSP traffic. The interface manager 309 may publish forwarding structures for LSPs to the routing protocol modules 311A-311J. In certain situations, a routing protocol module will use an LSP for routing purposes, but in more situations, the routing protocol modules 311A-311J do not use LSPs. Hence, resources are used inefficiently if the interface manager published all forwarding structures for LSPs to the routing protocol modules 311A-311J.

The label manager 307 publishes forwarding structures for LSPs to the interface manager 309, but the interface manager 309 only publishes forwarding structures for LSPs to routing protocol modules that have registered interest in forwarding structures for LSPs. In an alternative embodiment, the label manager 307 publishes forwarding structures for LSPs to the interface manager 309 with indicators. The indicator for each forwarding structure either permits or inhibits the interface manager's 309 ability to publish each forwarding structure. In an alternative embodiment, the routing protocol modules 311A-311J register interest in certain LSPs with the label manager 307. The label manager 307 may publish those certain LSPs to the registered ones of the routing protocol modules 311A-311J or publish those certain LSPs to the interface manager 309, which then publishes all forwarding structures received from the label manager 307.

The routing protocol modules 311A-311J publish information from their routing tables to the routing information base 313. The information includes the interfaces and/or forwarding structures in the routing tables of the routing protocol modules 311A-311J. The routing information base 313 publishes information as forwarding information bases (FIBs) 317A-317D to a data plane 321.

The label manager 307 distributes information from the LSP structures 308A-308W to the data plane 321. The label manager 307 distributes information from the LSP structures 308A-308W to label forwarding information bases (LFIBS) 315A-315C and LSP adjacency tables 316A-316D. The label manager 307 may target distribution of information to certain LFIBS 315A-315C and certain LSP adjacency tables 316A-316D.

When establishing an LSP, the label manager 309 determines either an ingress (i.e., slot, port, and flow identifier) for the LSP into the network element, an egress for the LSP from the network element, or both, depending on the role of the network element (i.e., whether the network element is acting as an egress router, an ingress router, or a transient router). With this information, the label manager 309 distributes information to one of the LFIBS 315A-315C located on the line card determined as the ingress point into the network element for the LSP and distributes information to the one of the LSP adjacency tables 316A-316D located on the line card determined to be the egress points from the network element for the LSP Representing an LSP with the forwarding structure instead of an interface reduces memory consumption and reduces the amount of data communicated across from the control plane 301 to the data plane 321. The LSP structure is a relatively inexpensive structure and identifies information for transmission of packets corresponding to the LSP identified by the LSP structure. The reduced cost of representing an LSP enables a network element to maintain a relatively large number of LSPs. Resources are further conserved because forwarding structures are not propagated to all routing protocol modules, the routing information base, and all forwarding information bases. In addition, representing an LSP with a forwarding structure provides uniform presentation of forwarding structures for LSPs and forwarding structures for non-LSP traffic to a network element.

Figure 5A:
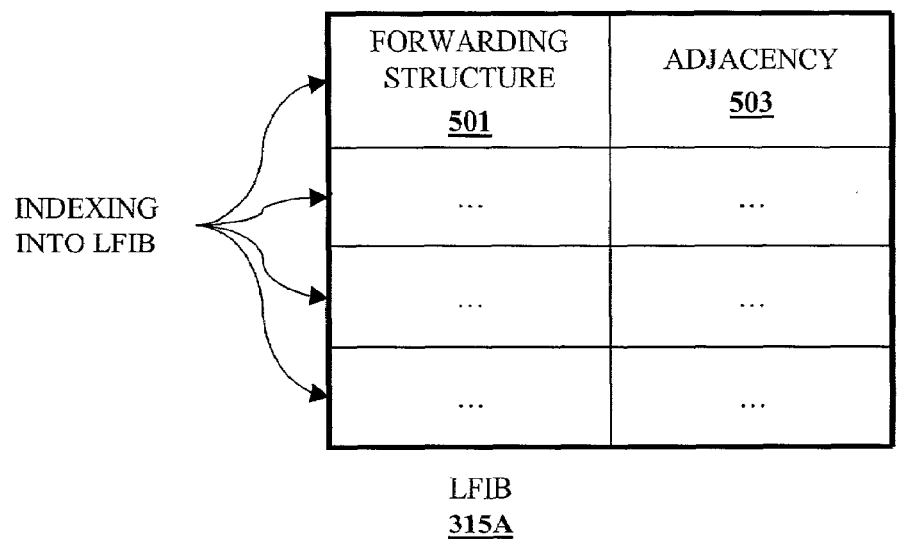
FIG. 5A is an exemplary diagram illustrating the LFIB 215A according to one embodiment of the invention.

FIG. 5A is an exemplary diagram illustrating the LFIB 315A according to one embodiment of the invention. In FIG. 5A, the LFIB 315A includes two fields for each entry: a forwarding structure field 501 and an adjacency field 503. Although the LFIB 315A is illustrated as a table, the illustration is meant to be conceptual. The LFIB 315A may be implemented in a variety of ways (e.g., a binary search tree, a radix trie, a hash table, etc.). As previously described, the label manager 307 populates the LFIB 315A. When a packet is received that includes a label, the LFIB 315A is indexed into for an entry that corresponds to the label (the manner of this indexing depends on the implementation; while in one embodiment the LFIB is addressed by some form of the label, alternative embodiments may use other techniques (e.g., storing some form of the labels in each entry and searching the table using well known techniques, etc.)). The forwarding structure field 501 indicates a forwarding structure. The adjacency field 503 indicates adjacency information.

Figure 5B:
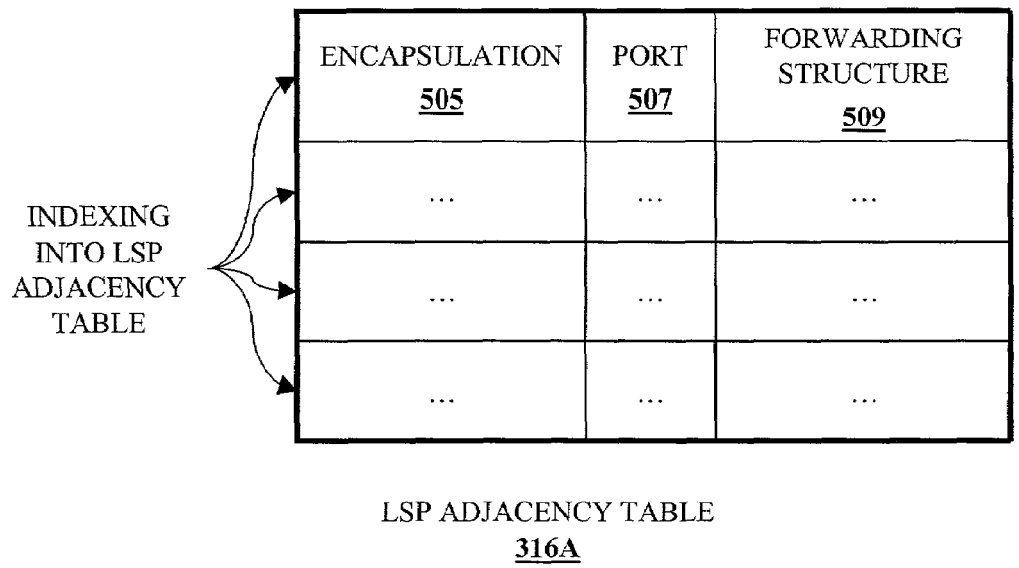
FIG. 5B is an exemplary diagram illustrating the LSP adjacency table 216A according to one embodiment of the invention.

FIG. 5B is an exemplary diagram illustrating the LSP adjacency table 316A according to one embodiment of the invention. Although the LSP adjacency table 316A is illustrated as a table, it may be implemented with a variety of data structures (e.g., a binary search tree, a radix trie, a hash table, etc.). Ir. FIG. 5B, the LSP adjacency table 316A includes three fields for each entry: an encapsulation field 505, a port field 507, and a forwarding structure field 509. The encapsulation field 505 indicates an encapsulation that includes an egress label to be added to a set of packets. The port field 507 indicates an egress port. Alternative embodiments may not include an egress port if not necessary (e.g., a card with a single egress port). The forwarding structure field 509 indicates a forwarding structure for the LSP in order to apply forwarding features (e.g., packet counters and packet classification).

Figure 6:
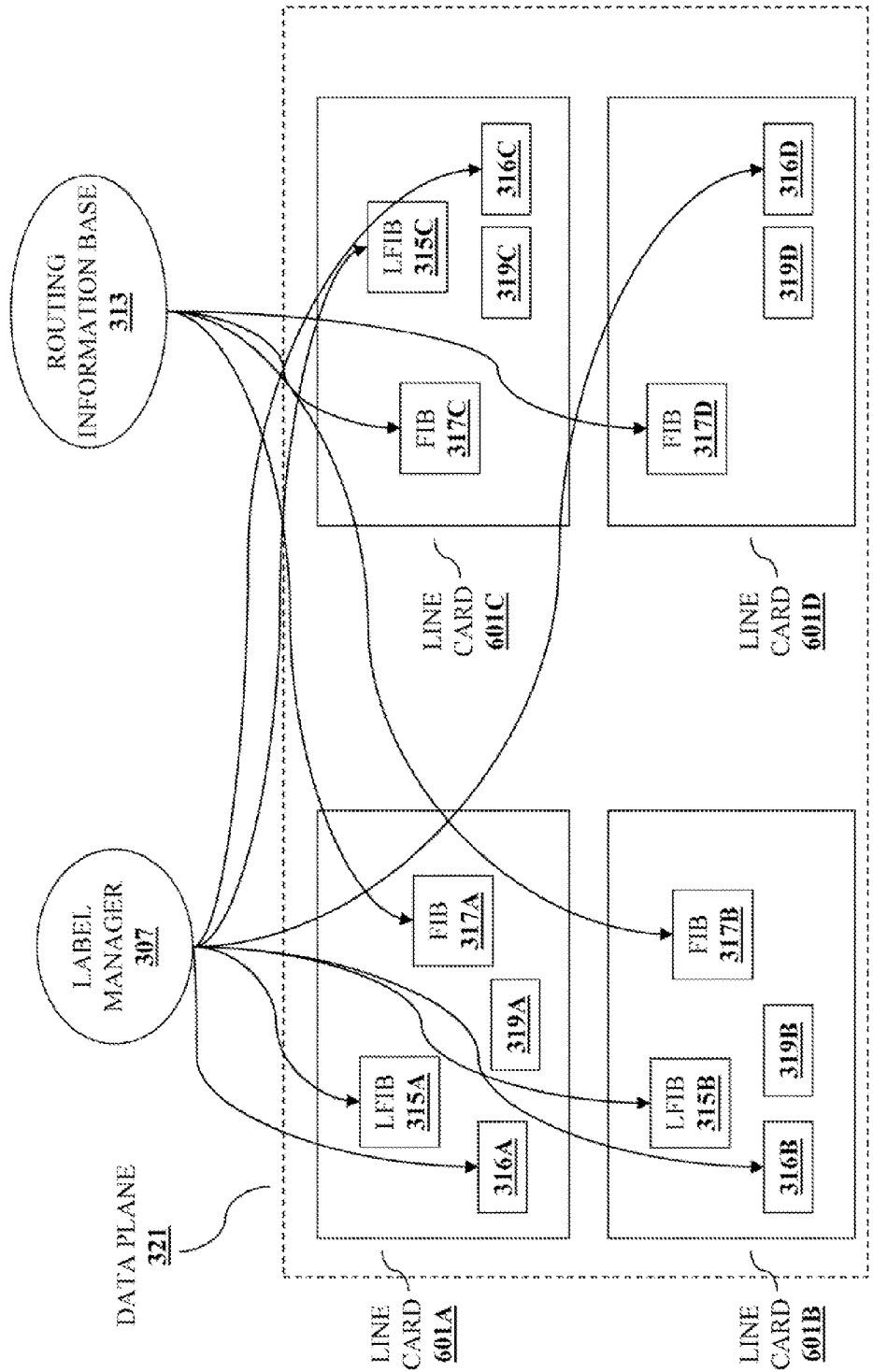
FIG. 6 is an exemplary diagram illustrating the data plane 221 according to one embodiment of the invention.

FIG. 6 is an exemplary diagram illustrating the data plane 321 according to one embodiment of the invention. In FIG. 6, the data plane 321 includes line cards 601A-601D. The line cards 601A-601C host LFIBS 315A-315C, FIBs 317A-317C, LSP adjacency tables 316A-316C, and adjacency tables 319A-319D. The line card 601D is illustrated as hosting the FIB 317D, the LSP adjacency table 316D, and the adjacency table 319D. The line card 601D does not host an LFIB in order to illustrate that a line card may not have an LFIB. Certain line cards may not have LFIBS and/or LSP adjacency tables because of the targeted distribution of information from the control plane. The label manager 307 populates the LFIBS 315A-315C on relevant line cards with relevant information from the LSP structures 308A-308W. As previously explained, the label manager 307 may determine relevant line cards with information received from the signaling protocols 303A-303C and/or the user interface 305. In contrast, the routing information base 313 downloads forwarding information to the FIBs 317A-317D on each of the line cards 601A-601D. FIG. 6 also illustrates the label manager 307 populating the LSP adjacency tables 316A-316D respectively located on the line cards 601A-601D. Although the line card 601D does not host an LFIB, the label manager 307 may populate the LSP adjacency table 316D with information corresponding to an LSP if the network element is acting as an ingress router or an egress router for an LSP as described later in more detail. The routing information base 313 populates the adjacency tables 319A-319D, but is not illustrated in order to avoid obscuring the invention.

As in the control plane, resources of the data plane are conserved because LSPs are represented with the forwarding structures. In addition, targeted distribution of LSP information from the control plane provides for further conservation of resources, to the point that a line card may not have any LSP information.

Figure 7A:
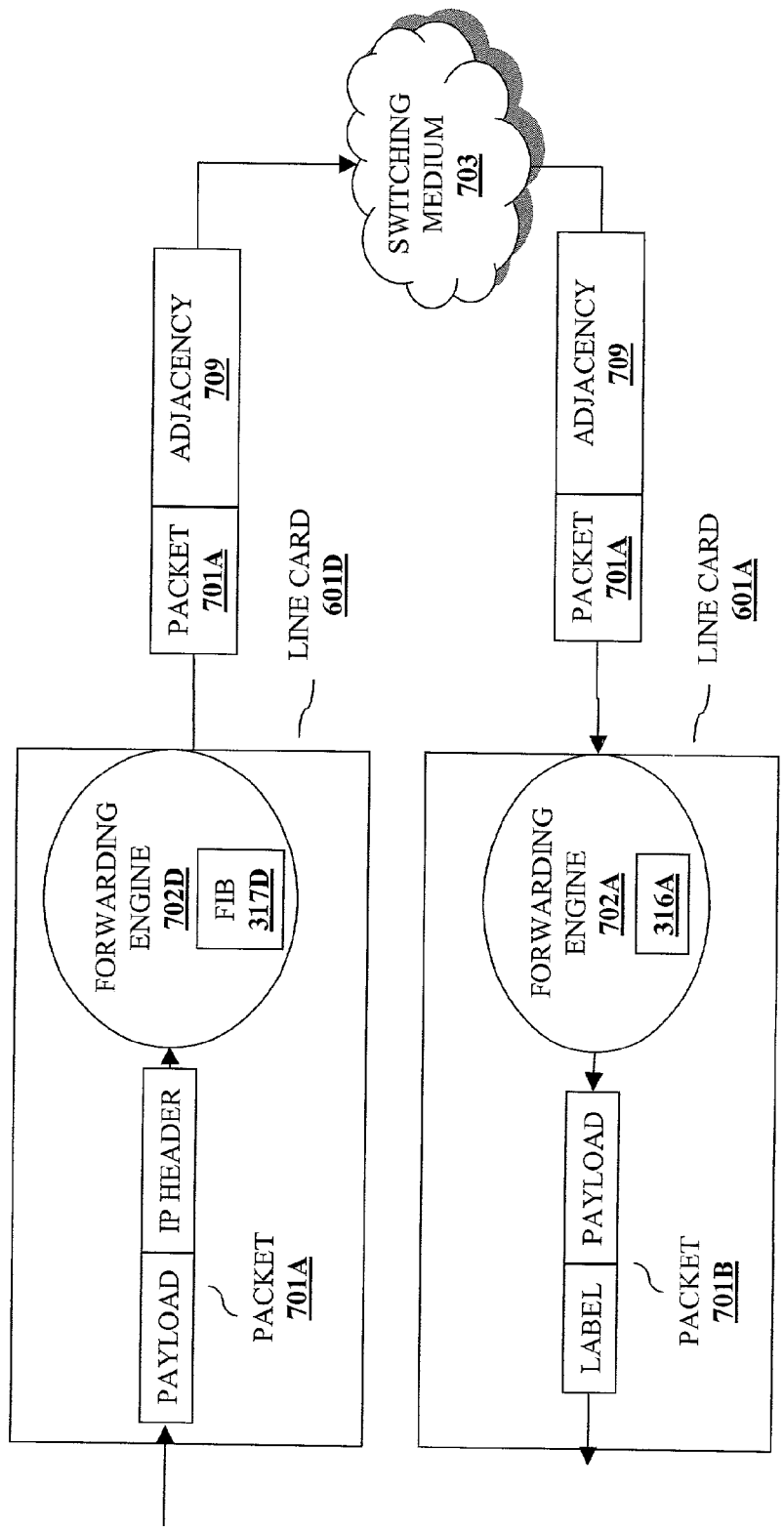
FIG. 7A is an exemplary diagram illustrating a packet transmitted along an LSP at a network element acting as an ingress router according to one embodiment of the invention.
Figure 7B:
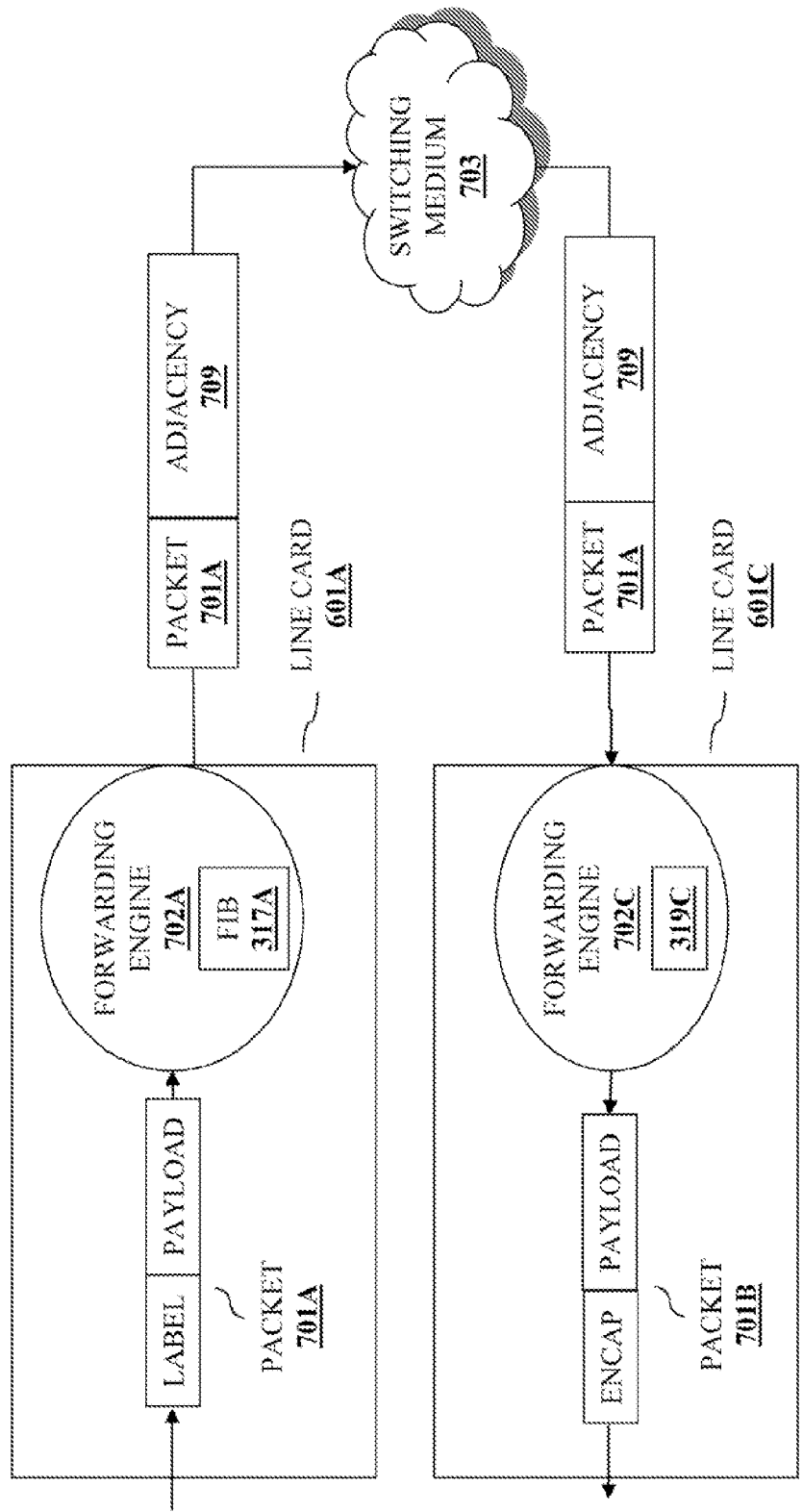
FIG. 7B is an exemplary diagram illustrating transmission of a packet along an LSP at a network element acting as an egress router according to one embodiment of the invention.
Figure 7C:
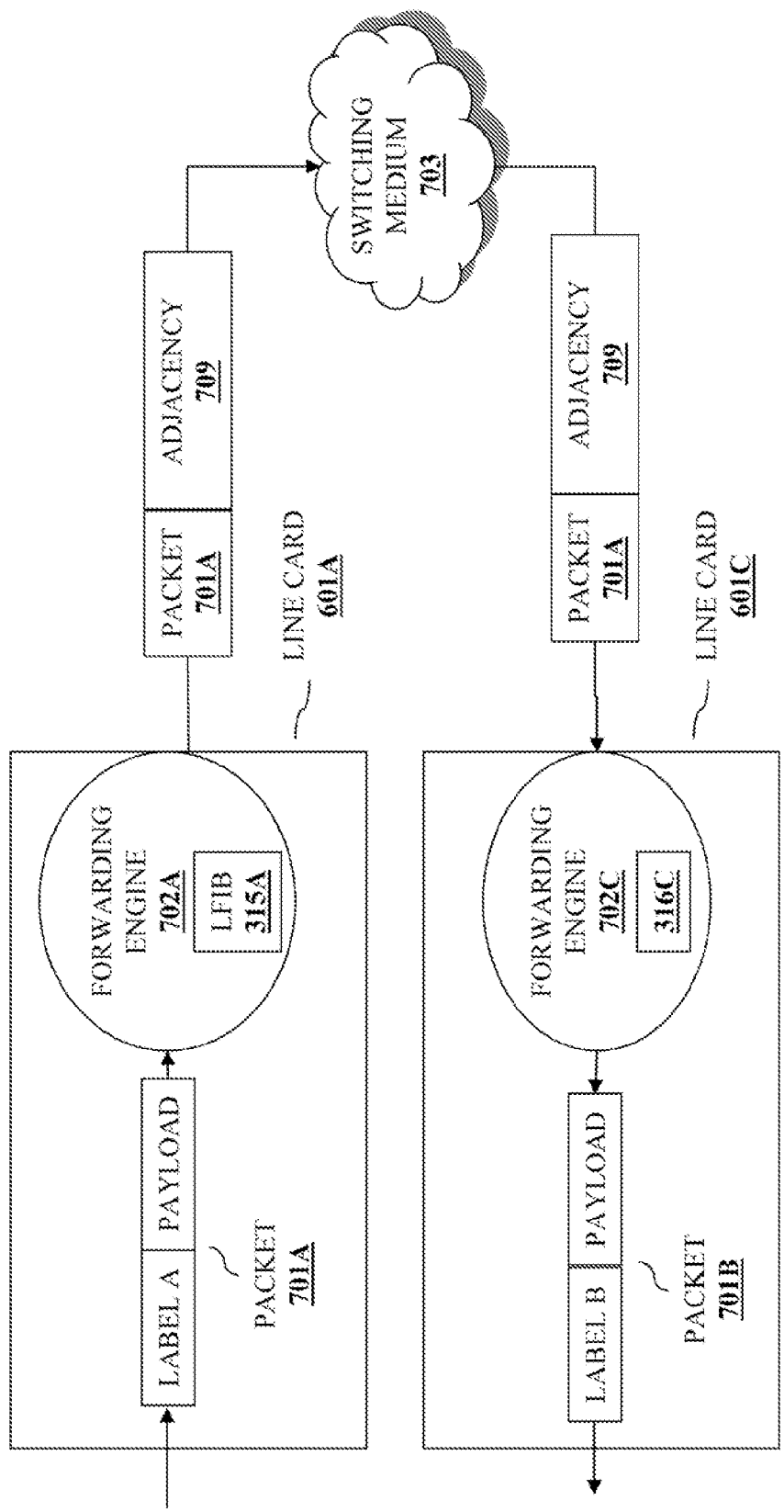
FIG. 7C is an exemplary diagram illustrating transmission of a packet along an LSP at a network element acting as a transient router according to one embodiment of the invention.

FIGS. 7A-7C are exemplary diagrams illustrating transmission of a packet along an LSP according to one embodiment of the invention. FIG. 7A is an exemplary diagram illustrating a packet transmitted along an LSP at a network element acting as an ingress router according to one embodiment of the invention. In FIG. 7A, the line card 601D receives a packet 701A that has been decapsulated from a data link layer encapsulation and associated with a forwarding structure that indicates the ingress into the network element. The packet 701A includes a payload and an IP header. The payload may include additional encapsulation information A forwarding engine 702D receives the packet 701A and processes the packet 701A in accordance with the FIB 317D. The forwarding engine 702D may also apply forwarding features (quality of service, packet counters, packet classification, etc.) to the packet 701A in accordance with the associated forwarding structure.

A switching medium 703 receives the packet 701A and adjacency information 709. The switching medium 703 forwards the packet 701A in accordance with the adjacency information 709. The switching medium 703 is hardware and/or software for determining where to forward packets. In one embodiment, the switching medium 703 is physically separate from the line cards. In another embodiment, the switching medium 703 is software and/or hardware on individual line cards. For example, the switching medium 703 may be software located on the line card 601D that processes the adjacency information 709 to determine which line of a set of lines interconnecting all line cards to forward the packet 701A. The switching medium 703 then forwards the packet 701A and the adjacency information 709 to the line card 601A. In an alternative embodiment, the switching medium 703 may receive the packet 701A and an adjacency ID. The switching medium 703 then accesses adjacency information identified by the adjacency ID.

A forwarding engine 702A on the line card 701A receives the packet 701A and the adjacency information 709. The forwarding engine 702A processes the packet 701A in accordance with the LSP adjacency table 316A. The forwarding engine 702A uses the adjacency information 709 to look up encapsulation information and possibly a port for the packet 701B. The forwarding engine may also apply forwarding features associated with a forwarding structure that indicates the LSP. The forwarding engine 702A then transmits the packet 701B that includes an egress label identified in the LSP adjacency table 316A after encapsulating the packet 701B in a data link layer encapsulation.

FIG. 7B is an exemplary diagram illustrating transmission of a packet along an LSP at a network element acting as an egress router according to one embodiment of the invention. In FIG. 7B, the line card 601A receives a packet 701A that has been decapsulated from a data link layer encapsulation and that includes an ingress label and a payload. The payload may include additional encapsulations. The forwarding engine 702A receives the packet 701A and pops the label from the packet 701A. The forwarding engine 702A then processes the packet 701A in accordance with the FIB 317A and determines adjacency information from the FIB 317A. The forwarding engine 702A may apply forwarding features (e.g., quality of service, packet classification, packet counters, etc.), which are associated with the forwarding structure indicated in the FIB 317A, to the packet 701A. The forwarding engine 702A then passes the packet 701A and the identified adjacency information 709 to the switching medium 703.

The switching medium 703 forwards the packet 701A and the adjacency information 709 to the line card 601C, assuming the adjacency information identifies the slot hosting the line card 601C. A forwarding engine 702C on the line card 601C processes the packet 701A and the adjacency information 709. The forwarding engine 702C determines the encapsulation for the packet 701A in accordance with the encapsulation corresponding to the adjacency information 709. The forwarding engine 702C may apply forwarding features (e.g., packet classification, packet counters, etc.) associated with the forwarding structure identified by the adjacency information 709. The forwarding engine 702C may also determine the proper egress port for the packet 701A in accordance with the adjacency information 709. The forwarding engine 702C then generates a packet 701B and transmits the packet 701B in accordance with the adjacency information 709 and information identified in the adjacency table 319C. The forwarding engine 702C applies encapsulation information (e.g., ATM, frame relay, etc.) to the packet 701A to generate the packet 701B. The data of the packet 701B may include additional encapsulations.

FIG. 7C is an exemplary diagram illustrating transmission of a packet along an LSP at a network element acting as a transient router according to one embodiment of the invention. In FIG. 7C, the line card 601A receives a packet 701A that has been decapsulated from a data link layer encapsulation and that includes an ingress label and a payload. The payload includes additional encapsulations and may include additional labels. The forwarding engine 702A processes the packet 701A in accordance with the LFIB 315A. The forwarding engine 702A determines a forwarding structure and adjacency information that corresponds to the ingress label of the packet 701A in the LFIB 315A. The forwarding engine 702A may apply forwarding features (e.g., quality of service, packet classification, packet counters, etc.), which are associated with the indicated forwarding structure, to the packet 701A. The forwarding engine 702A passes the packet 701A and the adjacency information 709 to the switching medium 703.

The switching medium 703 forwards the packet 701A and the adjacency information 709 to the line card 601C, again assuming the adjacency information 709 identifies the slot hosting the line card 601C. The forwarding engine 702C processes the packet 701A in accordance with the LSP adjacency table 316C. The forwarding engine 702C determines encapsulation information and possibly a port corresponding to the adjacency information 709. The forwarding engine 702C may apply forwarding features associated the forwarding structure indicated in the LSP adjacency table 316C. The forwarding engine 702C transmits a packet 701B that includes an egress label indicated in the LSP adjacency table 316C after encapsulating the packet 701B with data link layer encapsulation(s).

As illustrated in FIGS. 7A-7C, representing LSPs with forwarding structures enables transparent application of forwarding features to packets traversing an LSP and uniform presentation of LSPs with non-LSP traffic. Forwarding features are applied to LSP traffic and non-LSP traffic with forwarding structures. The complexity of the hosting network element is reduced because forwarding features can be indexed in the same manner for LSP traffic and non-LSP traffic.

Figure 8:
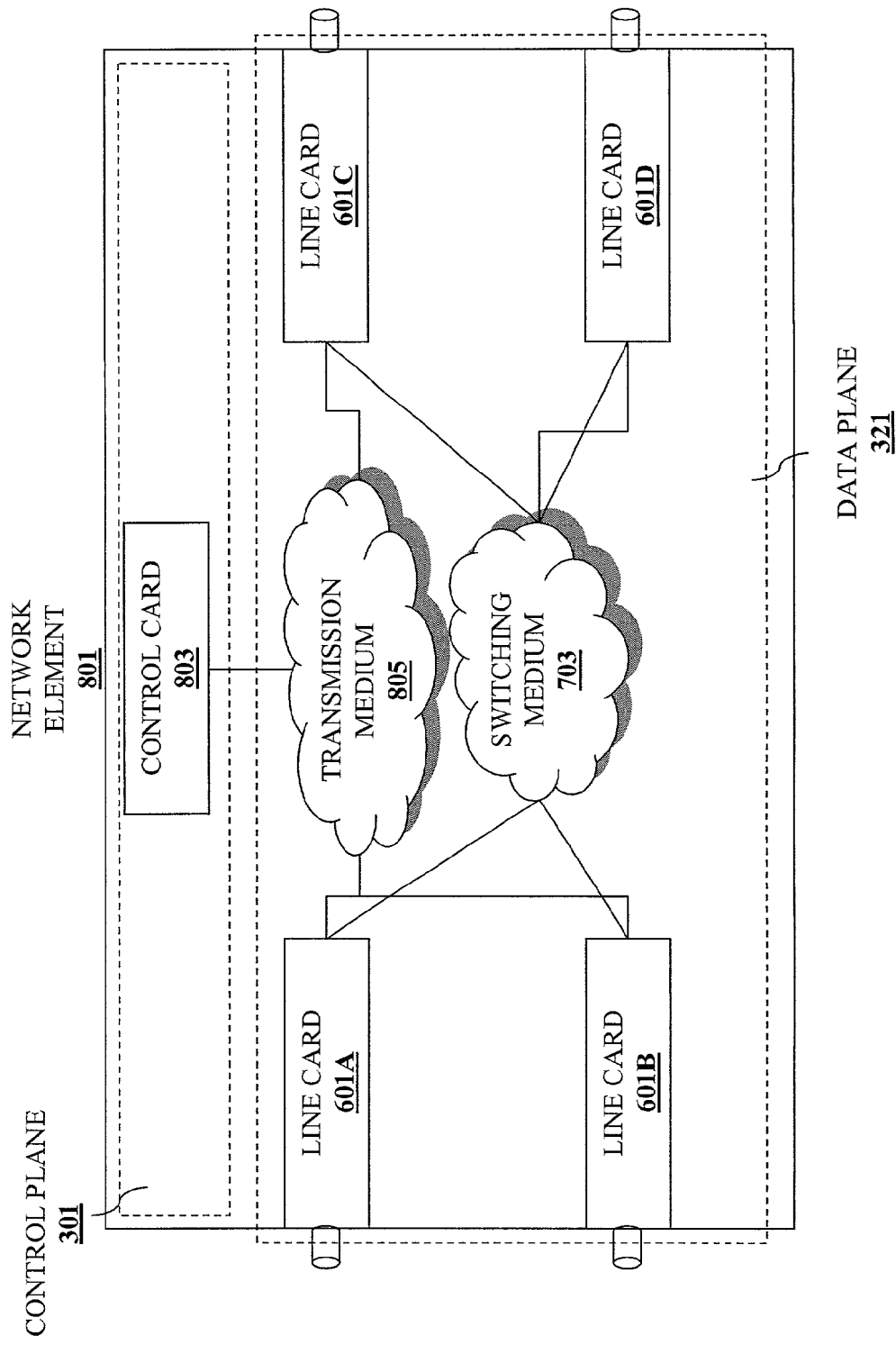
FIG. 8 is a diagram of an exemplary network element according to one embodiment of the invention.

FIG. 8 is a diagram of an exemplary network element according to one embodiment of the invention. In FIG. 8, the network element includes a control card 803 in the control plane 301. The control card 803 is coupled with a transmission medium 805 (e.g., a system bus) in the data plane 321. The transmission medium 805 is coupled with the line cards 601A-601D. The transmission medium 805 carries information from the control card 803 to the line cards 601A-601D. The line cards 601A-601D are coupled with each other via the switching medium 803. As previously described, the switching medium may be a separate switching unit including hardware and/or software to determine which line card to forward traffic. Alternatively, the switching medium may be a mesh.

The control card 803 and the line cards 601A - 601D illustrated in FIG. 8 include memories, processors, and/or ASICs. Such memories include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores) information in a form readable by a machine (e.g., a computer). For example, a machine-readable medium includes read only memory ('ROM"), random access memory ("RAM"), magnetic disk storage media, optical storage media, or flash memory devices.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

We claim:

1. A method for a network element comprising:

maintaining, for network layer switched routes, interface structures each storing a set of network layer information;

distributing each of the interface structures to a set of one or more of a plurality of routing protocol modules;

maintaining a routing information base responsive to the plurality of routing protocol modules;

distributing forwarding information bases (FIBs) including network layer information to each of a plurality of line cards;

maintaining for each of a plurality of label switched paths (LSPs) a forwarding data structure that is separate from the interface structures and that does not include the set of network layer information; and selectively distributing different ones of the forwarding data structures to different ones of the plurality of line cards to establish label forwarding information bases (LFIBs) devoid of network layer information, wherein the LFIBs are separate from the FIBs, wherein each forwarding data structure is selectively distributed to only the one of the plurality of line cards that is an ingress roint into the network element for the LSP represented by that forwarding data structure.

2. The method of claim 1 wherein the forwarding data structure includes a first field to indicate a port, a second field to indicate a slot, and a third field to indicate a flow.

3. The method of claim 2 wherein the port is a virtual port and the slot is a virtual slot.

4. The method of claim 1 further comprising maintaining for each forwarding structure, a data structure that indicates an egress slot and encapsulation information.

5. The method of claim 4 wherein the data structure further indicates an egress port.

6. The method of claim 4 further comprising distributing the egress slot and encapsulation information from different ones of the data structures to different ones of the line cards apart from distribution to the plurality of routing protocol modules and the routing information base.

7. A network element comprising:
a plurality of line cards;
a control card having stored therein,
a plurality of interface structures having stored therein network layer information;
a plurality of routing protocol modules coupled to one or more of the plurality of interface structures;
a routing information base (RIB) coupled to said plurality of routing protocol modules;
a plurality of forwarding data structures devoid of network layer information separate from the interface data structures, the plurality of forwarding data structures each having stored therein information to determine forwarding of packets from an ingress one of said plurality of line cards to an egress one of said plurality of line cards for a label switched rath (LSP);
a label manager to selectively distribute different ones of the forwarding data structures to different ones of the plurality of line cards and to selectively distribute a subset of the plurality of forwarding data structures to the plurality of routing protocol modules, wherein a particular one of the forwarding data structures is selectively distributed to a particular one of the line cards only if that line card is an ingress roint into the network element for the LSP represented by the particular forwarding data structure; and
a first of said plurality of line cards having stored therein,
a label forwarding information base (LFIB) generated from at least certain of said plurality of forwarding data structures indicating that the first line card is an ingress roint into the network element for the label switched paths (LSPs) rerresented by the plurality of forwarding data structures, the label forwarding information base (LFIB) being devoid of network layer information; and
a network layer forwarding information base (FIB) generated from said routing information base (RIB).

8. The network element of claim 7 wherein said information includes a slot identifier, a port identifier, and a flow identifier.

9. The network element of claim 8 wherein the slot identifier of each forwarding structure indicates the same virtual slot and the port identifier for each forwarding structure indicates the same virtual port.

10. The network element of claim 7 wherein the control card further has stored therein a plurality of data structures, different ones of the plurality of data structures indicating different ones of said plurality of forwarding structures, egress slots, and encapsulation information.

11. A machine-readable medium that provides instructions, which when executed by a set of one or more processors, cause said set of processors to perform operations comprising:
maintaining in a control plane a first data structure that represents a label switched path (LSP), the first data structure indicating a virtual port, a virtual slot, and an identifier to distinguish LSPs of the virtual port and the virtual slot;
maintaining in the control plane a second data structure indicating the first data structure, a slot, encapsulation information, and an index for the slot and the encapsulation information;
selectively distributing the first data structure, the index, and an egress label identifier to only a label forwarding information base (LFIB) on a first line card in a data plane, the LFIB being devoid of network layer information, and selectively distributing the first data structure, the index, and the egress label identifier to one or more routing protocol modules in the control plane, wherein the selective distribution to the LFIB is based on an ingress point for the LSP; and
distributing the index and the encapsulation information to only an adjacency data structure on a second line card within the data plane based on an egress point for the LSP.

12. The machine-readable medium of claim 11 wherein the second data structure further indicates a port.

13. The machine-readable medium of claim 11 wherein the encapsulation information includes an egress label.

14. A machine-readable medium that provides instructions, which when executed by a set of one or more processors, cause said set of processors to perform operations comprising:
maintaining, for network layer switched routes, interface structures each storing a set of network layer information;
distributing each of the interface structures to a set of one or more of a plurality of routing protocol modules;
maintaining a routing information base responsive to the plurality of routing protocol modules;
distributing forwarding information bases (FIBs) including network layer information to each of a plurality of line cards;
maintaining for each of a plurality of label switched paths (LSPs) a forwarding data structure that is separate from the interface structures and that does not include the set of network layer information; and
selectively distributing different ones of the forwarding data structures to different ones of the plurality of line cards to establish label forwarding information bases (LFIBs) devoid of network layer information, wherein the LFIBs are separate from the FIBs, wherein each forwarding data structure is selectively distributed to only the one of the plurality of line cards that is an ingress point into a network element for the LSP represented by that forwarding data structure.

15. The machine-readable medium of claim 14 wherein the forwarding data structure includes a first field to indicate a port, a second field to indicate a slot, and a third field to indicate a flow.

16. The machine-readable medium of claim 15 wherein the port is a virtual port and the slot is a virtual slot.

17. The machine-readable medium of claim 14 further comprising maintaining for each forwarding structure, a data structure that indicates an egress slot and encapsulation information.

18. The machine-readable medium of claim 17 wherein the data structure further indicates an egress port.

19. The machine-readable medium of claim 17 further comprising distributing the egress slot and encapsulation information from different ones of the data structures to different ones of the line cards apart from distribution to the plurality of routing protocol modules and the routing information base.

20. A method for a network element comprising:
- maintaining in a control plane a first data structure that represents a label switched path (LSP), the first data structure indicating a virtual port, a virtual slot, and an identifier to distinguish LSPs of the virtual port and the virtual slot;
- maintaining in the control plane a second data structure indicating the first data structure, a slot, encapsulation information, and an index for the slot and the encapsulation information;
- selectively distributing the first data structure, the index, and an egress label identifier to only a label forwarding information base (LFIB) on a first line card in a data plane, the LFIB being devoid of network layer information, and selectively distributing the first data structure, the index, and the egress label identifier to one or more routing protocol modules in the control plane, wherein the selective distribution to the LFIB is based on an ingress point for the LSP; and
- distributing the index and the encapsulation information to only an adjacency data structure on a second line card within the data plane based on an egress point for the LSP.

21. The method of claim 20 wherein the second data structure further indicates a port.

22. The method of claim 20 wherein the encapsulation information includes an egress label.

* * * * *